B. HARNISH & D. H. HARNISH.

Improvement in Corn-Shellers and Separators.

No. 127,051. Patented May 21, 1872.

Witnesses.
D. M. Stauffer
H. C. Stauffer

Inventors.
Benj. Harnish (miller)
D. H. Harnish.
per J. Stauffer Atty

127,051

UNITED STATES PATENT OFFICE.

BENJAMIN HARNISH, OF LANCASTER, AND DAVID H. HARNISH, OF PEQUEA, PENNSYLVANIA.

IMPROVEMENT IN CORN-SHELLERS AND SEPARATORS.

Specification forming part of Letters Patent No. 127,051, dated May 21, 1872.

Specification describing certain Improvements in a Combined Corn-Sheller and Cleaner, invented, jointly, by BENJAMIN HARNISH, of Lancaster, and DAVID H. HARNISH, of Pequea, in the county of Lancaster and State of Pennsylvania.

The first part of our invention relates to the arrangement of the shafts and gearing adapted to perform the same functions by transferring the combined fly-wheel and blower from one side to the other of the case, and performing four times the work with horse-power applied; or, for a single feed, to be used with ease and convenience by hand. The second part of our invention relates to the arrangement of the feed-box and appliances, in combination with a screen-shaker, with the blower and fly-wheel combined for cleaning the shelled corn, and discharge it into side elevators to be conveyed into bags ready for transportation.

The accompanying drawing making a part of this specification, with the letters of reference marked thereon, will enable any one skilled in the art to make and use our invention, in which—

Figure 1:
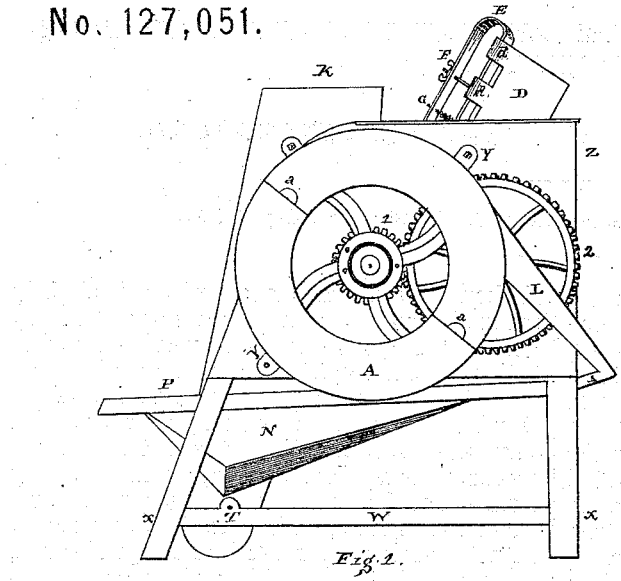
Figure 2:
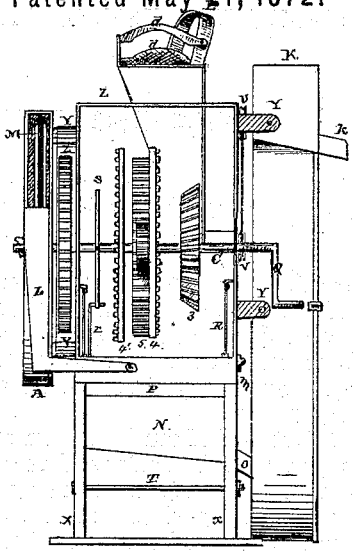
Figure 4:
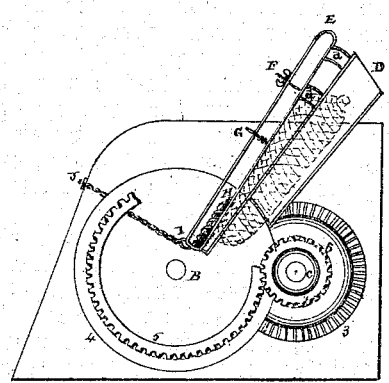
Figure 3:
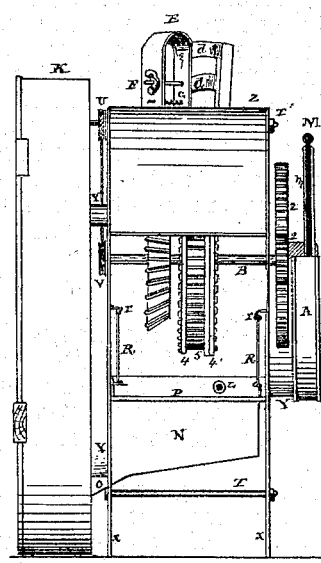

Figure 1 shows a side elevation, with fan and gearing; Fig. 2, an end view of the rear, open, to show the appliances; Fig. 3, a front-end view with the door raised to show parts within; Fig. 4, the feed-box and its several parts separately shown.

The external casing $z$ and supports or legs $x$ require no further notice.

In Fig. 1, A shows the fan-casing open centrally, which shows four winged arms, curved, and combined with diagonal wings under the enlarged rim M of an ordinary balance or fly wheel. These incased wings act as a fan or blower, and thus answer a twofold purpose. This fan-shaft B has a pinion, 1, which is driven by a cogged wheel, 2, thus giving the fan great speed. L shows an attached spout or pipe, through which the blast is conveyed from the fan-case A down and into the rear of the machine to blow over the screen P, and cleans the shelled corn, which drops through the screen into a doubly-inclined receptacle, N, from which it passes through a spout, O, into the elevator-box K, in which it is raised and discharged through a spout, $k$, into bags suspended for the purpose. The corn-cobs are shaken out over the screen, which is slightly inclined forward. The sides are suspended by links and loops R $r$ at the four corners within the frame, and receive the shaking motion from four arms, $s$, (or more,) projecting from the shaft C, which strike an arm at right angles on a vertical rod, $t$, affixed to the bottom of the screen. The hopper D, inclined in the ordinary manner for the reception of the ears of corn, has a flat spring, E, its entire length, with an adjusting-screw, F, and additional spiral spring G, as a guide to the yielding plate for embracing the ears of corn. These are fed down by means of a bevel-wheel, 3, with projecting flanges, which enter the feed-hopper D and come in contact with the corn and propel it forward or downward, the springs acting to press it against the shelling disk 4. There is also in the bottom of the hopper a revolving tapering feed with a spiral flange, H, and which revolves, held in bearings, in the bottom and side piece of the hopper, for the more perfect shelling of the pointed end of the corn. For a hand-sheller a single disk, 4, and a single hopper, D, is sufficient. There is a cogged wheel, 5, connected with the disk 4, (or, when two disks are used, between 4 and 4'.) This wheel is driven by a pinion, 6, on the same shaft, C, which carries the beveled feed-wheel 3 and turning-handle Q. This arrangement of the handle for the right hand near the feed-hopper gives the operator the greatest facility to turn with one hand and feed with the other. At the same time, by the double action on the fly-wheel and arrangement of the gearing, it will be seen that great speed is gained without loss of power. The extra pipe is not shown in the drawing, as it is but slightly different, so as to reach the same opening, being a little on one side of the center; otherwise it is the same. The letters Y shows the points of attachment of the box K for the elevators and fan-case A to the sides of the machine. U and V are pulleys for the belt to drive the buckets of the elevators. T are brace-rods; I J, the chain which supports the end of the hopper D. The fan-casing A is made in two sections obliquely joined at the points $a$, with laps. The shafts B and C, being on the same plane and parallel, allow of the transfer of the blower from one side to the other, having screws fixed for the burrs, so as to make the connection. By using two shelling-disks, one on each side of the cogged wheel 5, four feed-hoppers can be introduced, two on each side, in front and rear of the frame; and by attaching a belt-pulley in place of the one pinion this would only multiply, without changing the functions of the several parts.

The object is more for the purpose of a convenient and easily-operated single-feed hand corn-sheller, cleaner, and bagging arrangement.

We are aware that toothed disks, as well as blowers and elevators, have been used in a variety of combinations in corn-shellers; but we are not aware that a combined fly-wheel and blower was ever used in a corn-sheller, substantially made and operated by a pinion and cogged gear, so arranged as to be readily transferred from one side of the machine to the other, and to perform the same functions, besides other minor improvements in the arrangement and operation of the machine.

What we claim as our invention, and desire to secure by Letters Patent, is—

1. The balance-wheel M, provided with wings, in combination with a fan-case, A, and spout, L, substantially as and for the purpose set forth.

2. The combination of the shaft C, turning-handle Q, bevel-flange feed-wheel 3, pinion 6, cog-wheel 5, cross-arm S, screen P, with doubly-inclined bottom N, swinging-link R, bent-rod t, spout O, and elevators k, all arranged to operate substantially as and for the purpose set forth.

3. The combination in a corn-sheller, constructed substantially as described, of the feed-hopper D, adjusting-screw F, flat-spring E, spiral guide-spring and rod G, flanged or revolving feed-screw H, chain I J, and beveled feed-wheel 3, all arranged to operate as and for the purpose set forth.

B. HARNISH, (*Miller*.)
     D. H. HARNISH.

Witnesses:
 WM. B. WILEY,
 JACOB STAUFFER.